United States Patent [19]

Isaacs

[11] Patent Number: 5,201,397
[45] Date of Patent: Apr. 13, 1993

[54] METHOD AND APPARATUS FOR SEPARATING A STACK OF PRODUCTS INTO A STREAM OF SINGLE PRODUCTS FOR SORTING

[75] Inventor: Gerald A. Isaacs, Arlington, Tex.

[73] Assignee: ElectroCom Automation L.P., Arlington, Tex.

[21] Appl. No.: 593,783

[22] Filed: Oct. 5, 1990

[51] Int. Cl.⁵ .............................................. B65G 47/26
[52] U.S. Cl. ................................. 198/395; 198/460; 198/502.2; 209/539; 271/69; 271/199; 271/258; 271/270
[58] Field of Search ............... 209/539, 583, 569, 914, 209/934, 911, 900; 198/460, 502.2, 456, 395, 781; 271/258, 259, 270, 265, 69, 199; 364/478

[56] References Cited

U.S. PATENT DOCUMENTS

| | | | |
|---|---|---|---|
| 3,621,973 | 11/1971 | Carlson et al. | 198/456 |
| 3,752,312 | 8/1973 | Soltanoff | 209/583 X |
| 3,907,275 | 9/1975 | Bossons | 271/69 |
| 3,981,493 | 9/1976 | Kiappenecker et al. | 271/259 X |
| 4,150,743 | 4/1979 | Lazzaroti et al. | 198/460 |
| 4,503,976 | 3/1985 | Cloud et al. | 209/564 X |
| 4,610,359 | 9/1986 | Müller | 209/939 X |
| 4,640,408 | 2/1987 | Eaves | 198/460 |
| 4,697,689 | 10/1987 | Carrell | 198/396 X |
| 4,838,435 | 6/1989 | Alexandre et al. | 209/914 X |
| 4,863,154 | 9/1989 | Hirakama et al. | 198/460 X |
| 4,921,092 | 5/1990 | Crawford et al. | 198/460 |
| 5,058,727 | 10/1991 | Jahns et al. | 198/460 |
| 5,069,440 | 12/1991 | Lazzarotti et al. | 198/460 X |
| 5,070,995 | 12/1991 | Schaffer et al. | 198/460 |

FOREIGN PATENT DOCUMENTS 2189760 11/1987 United Kingdom ................ 198/460

Primary Examiner—Donald T. Hajec
Attorney, Agent, or Firm—Harold E. Meier

[57] ABSTRACT

A method and apparatus for separating feeding and sorting stacked products utilizes a computer controlled conveyor transport path. The transport path comprises infeed, separating and output sections. The infeed section includes an infeed conveyor and feed roller to regulate downstream movement into the separating section. The separating section includes a plurality of individually and selectively controlled friction feeder rolls arranged on a laterally tilted incline plane. The method and apparatus includes sensors along the separating section for determining position and relative movement of products. Through computer control, individual feeder rolls or sets of feeder rolls on the inclined plane are selectively energized to separate underlying products from stacked overlying or overlapping products. The foregoing process is repeated until all products in a stack have been separated into individual units. After separation the individual products are discharged through the output section for further processing.

6 Claims, 10 Drawing Sheets

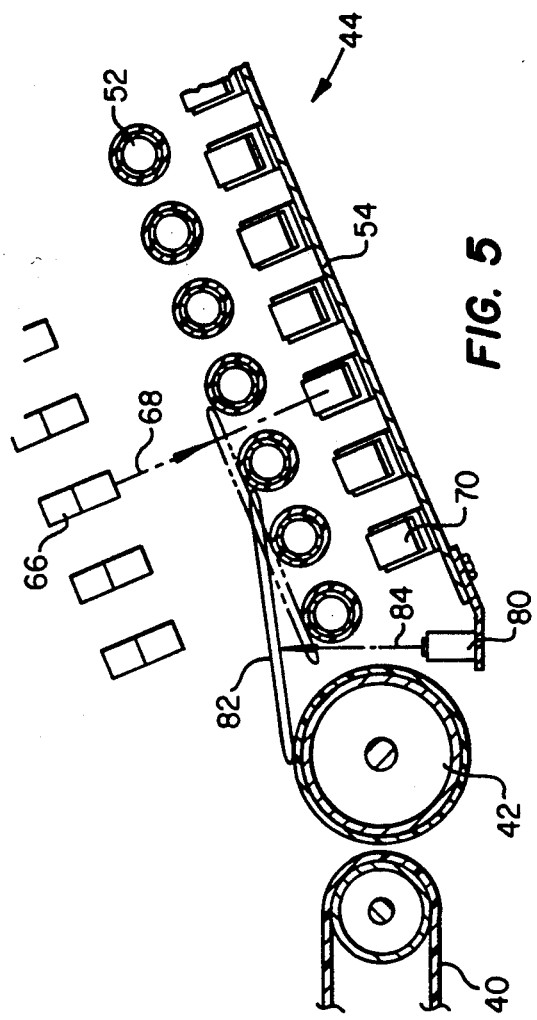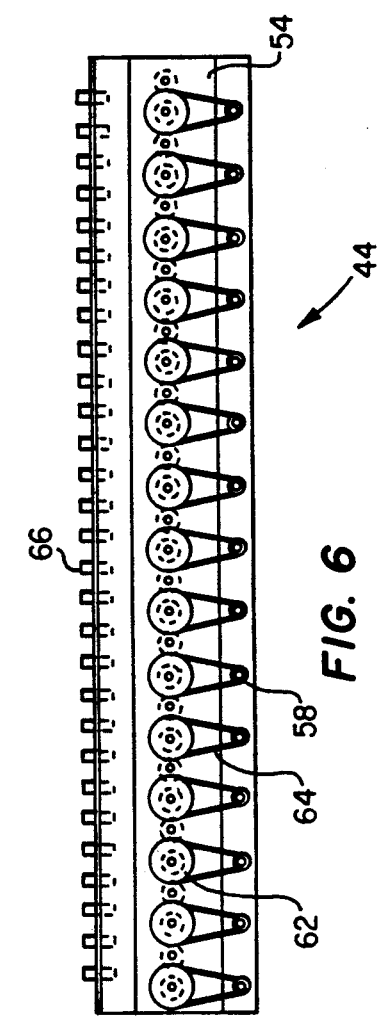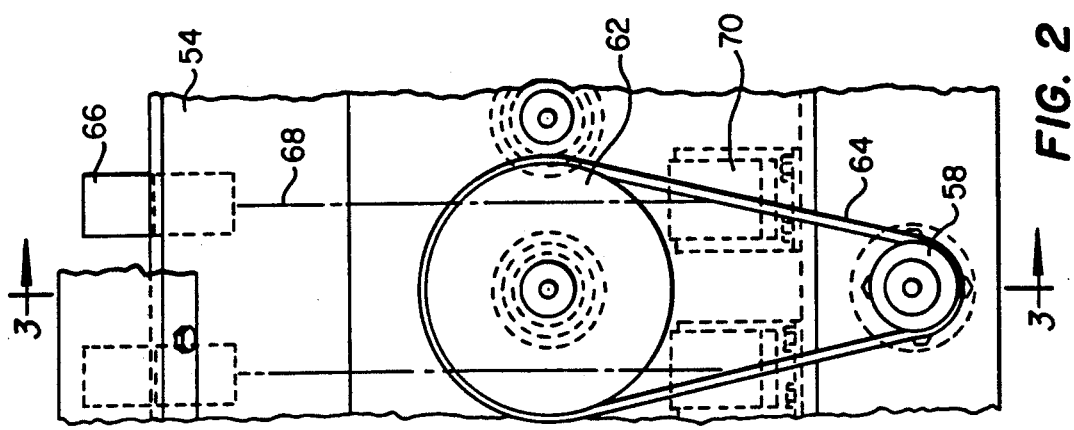

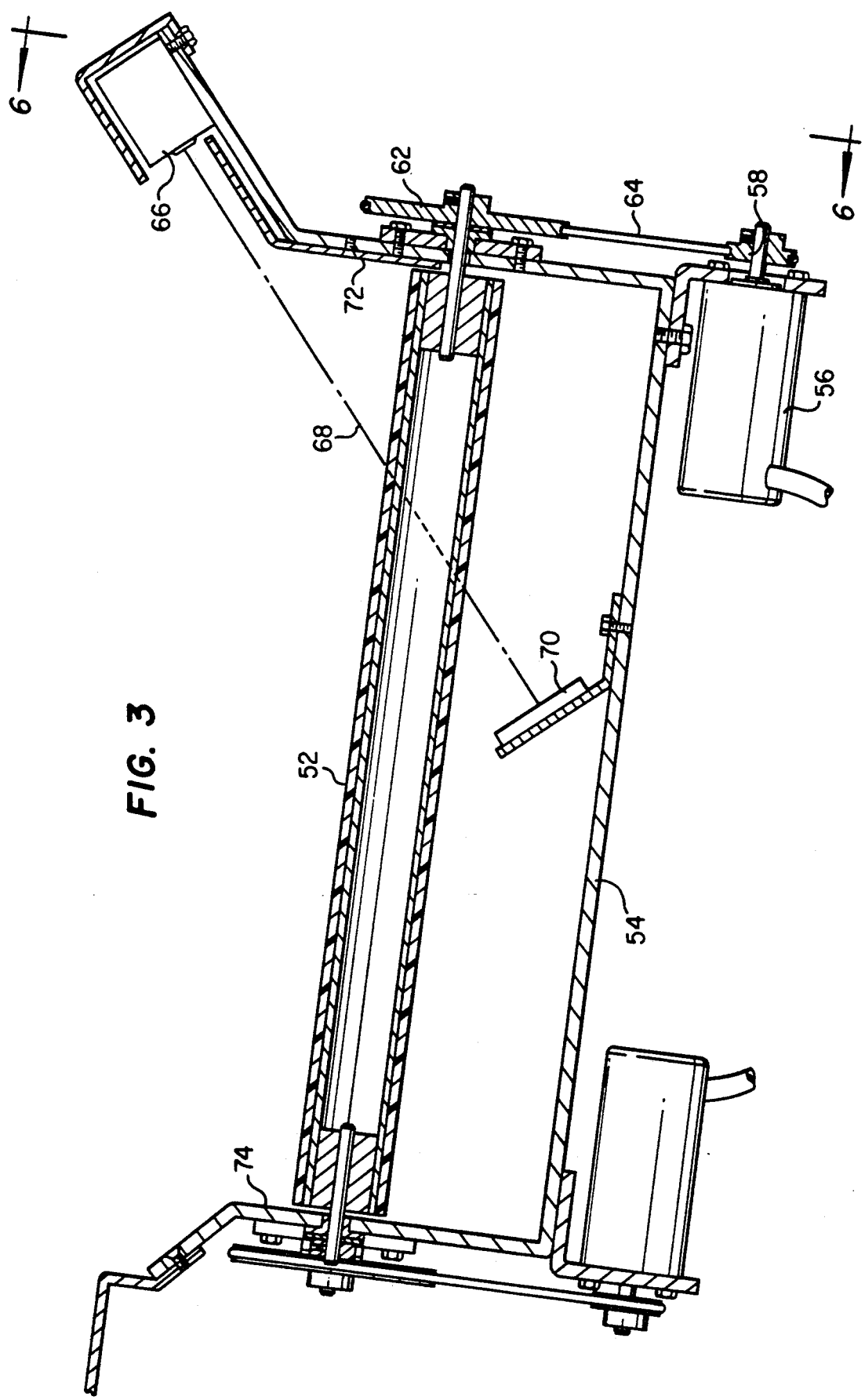

METHOD AND APPARATUS FOR SEPARATING A STACK OF PRODUCTS INTO A STREAM OF SINGLE PRODUCTS FOR SORTING

TECHNICAL FIELD

This invention relates to the separating a Stack of Products Into a Stream of Single Products For Sorting of flat packages, and more particularly to a method and apparatus for separating, feeding and sorting characterized by controlled movement of products through a transport path.

BACKGROUND OF THE INVENTION

Heretofore, many products were separated and sorted by individual human operators who segregated the products for further processing. One of the drawbacks of this manual system of processing was that total processing time was a function of each human operator's familiarity with the product. An operator who was unfamiliar with the product or who was confronted with an unrecognized product would be forced to make a manual check to ensure proper separation. This resulted in delays in the separating and sorting process, reducing the daily throughput and cutting into the profits of the operation.

An additional drawback of the human operator sorting is its susceptibility to error. A bored or careless operator may fail to correctly separate bulk products. This reflects poorly on the operation both economically and in terms of customer goodwill.

SUMMARY OF THE INVENTION

The present invention overcomes the foregoing problems associated with manual sorting by providing an apparatus for separating, feeding and sorting stacked bulk products In accordance with the broader aspects of the invention, a computer controlled conveyor mechanism characterized by an infeed conveyor belt, an inclined and tilted roller separator, an output conveyor belt, and a divert gate, receives stacked products at the upstream input end, separates the products into a single stream, determines if each qualifies for sorting and sorts the product into designated bins at the output end.

The infeed conveyor belt receives bulk stacks of products from a human loader and transports the products downstream to a feed roller. A sensor at the upstream end of the separator controls access to the separator. When the sensor detects the absence of a product resting on the upstream edge of the separator, the computer directs the apparatus to automatically deliver more products to the separator by causing the infeed conveyor belt to jog forward and the feed roller to rotate.

The separator consists of a series of individually and selectively controlled friction feeder rolls laterally tilted and arranged on an inclined plane. The inclination of the feeder rolls facilitates the use of gravitational forces to assist in separation of stacked and overlapping products. Rotation of the feeder rolls further assists the separation process by causing downstream movement of underlying products. Because the friction coefficient between the feeder rolls and the product is higher than that between two products and because of the angle of incline of the separator, the overlying products tend to slide in an upstream direction away from the underlying single product. Downstream movement of underlying products separates stacked products into a sequence of individual units. The computer monitors the location of each product on the separator and prevents "tailgating" of preceding products by maintaining a minimum distance between consecutive products. Each individual product is then propelled out of the separator onto the output conveyor belt. The lateral tilt of the feeder rolls causes each product to slide against one edge of the conveyor mechanism. This facilitates the sorting process at the output conveyor belt as described below.

In one application of the present invention, after the stacked products have been separated, lined up in a single file fashion against one edge and discharged onto the output conveyor belt, a bar code scanner reads a bar code on each product and compares it to a list of reference bar codes stored in the control computer. Accurate bar code scanning and sorting is facilitated by the location of each separated product against the edge of the conveyor mechanism. The scanner has a narrow field of view and scanning accuracy is maximized by locating the separated products against the edge of the conveyor mechanism adjacent to the scanner.

After scanning, the output conveyor belt transports the separated products to a sorting divert gate. If the bar code scanner fails to find a bar code on a scanned product, the computer causes the divert gate to direct the product into a first bin where the operator may reprocess the product through the present invention. If the bar code matches a stored bar code, the computer causes a divert gate to direct the product to a selected bin where it is assembled for further processing. Thus, bulk stacks of products are sorted more accurately and efficiently than the manual systems presently in use.

The automated separating, feeding and sorting apparatus of this invention may be adapted to process various stacks of flat packages with attached identifying bar codes. Possible applications include sorting of magazines, postal mail and warehouse inventory. Other advantages and applications deriving from the use of the invention will readily suggest themselves to those skilled in the art from consideration of the following detailed description taken in conjunction with the accompanying drawings.

BRIEF DESCRIPTION OF THE DRAWINGS

A more complete understanding of the invention may be had by reference to the following Detailed Description when taken in conjunction with the accompanying Drawings, wherein:

FIG. 2 is a side view of an individual feeder roll of the separator shown in FIG. 1;

FIG. 3 is a front elevation of an individual feeder rolls as shown in FIG. 2 of the separator shown in FIG. 1;

FIG. 5 is a partial side view of the apparatus of FIG. 1 showing the interrelation between the infeed conveyor belt, feed roller and feeder rolls;

FIG. 6 is a side view of the separator illustrated in FIG. 4; and

DETAILED DESCRIPTION OF THE INVENTION

Figure 1:
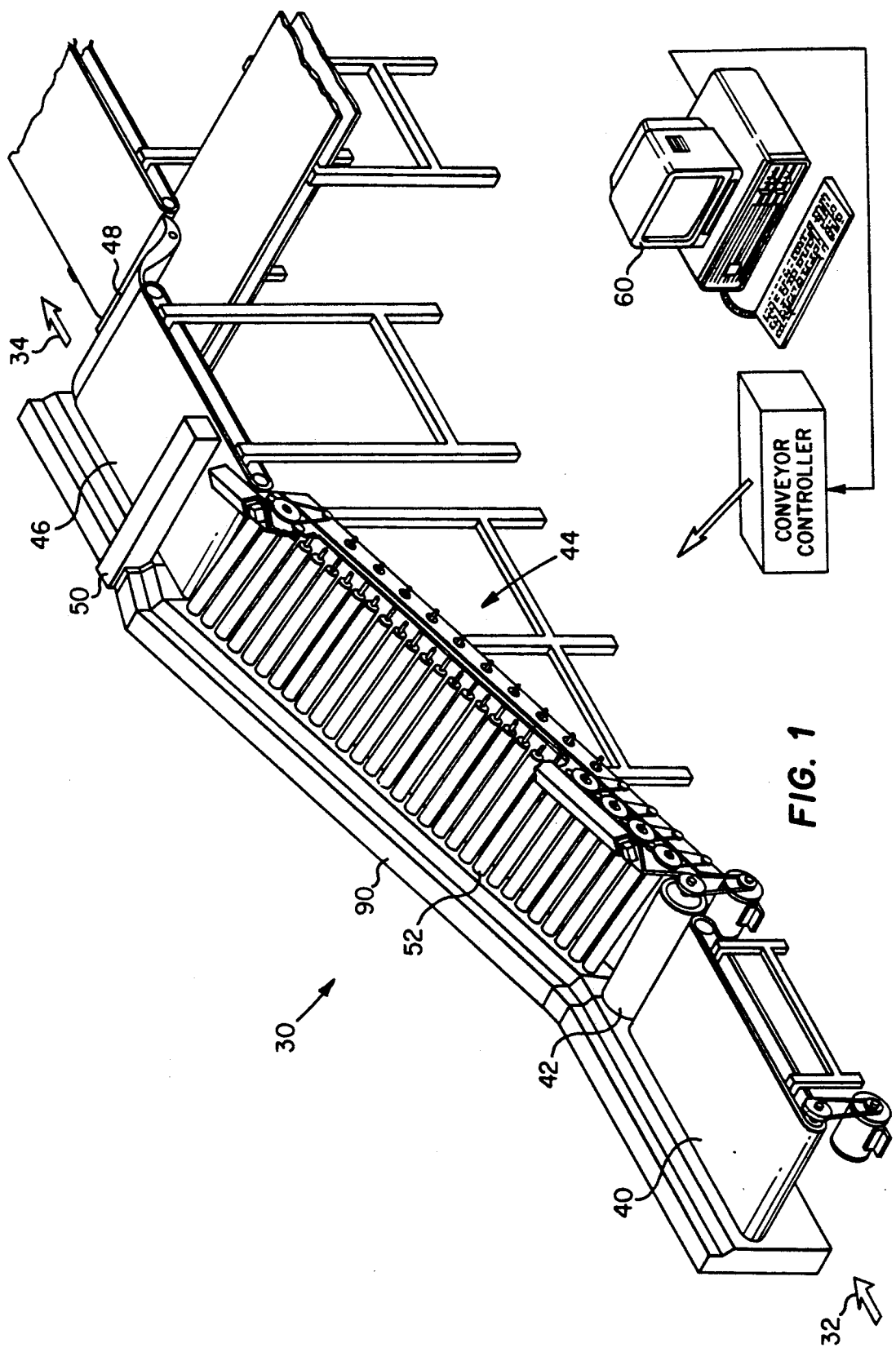
FIG. 1 is a perspective view of the separating, feeding and sorting apparatus in which parts have been cut away to more clearly illustrate certain features of the invention.
Figure 4:
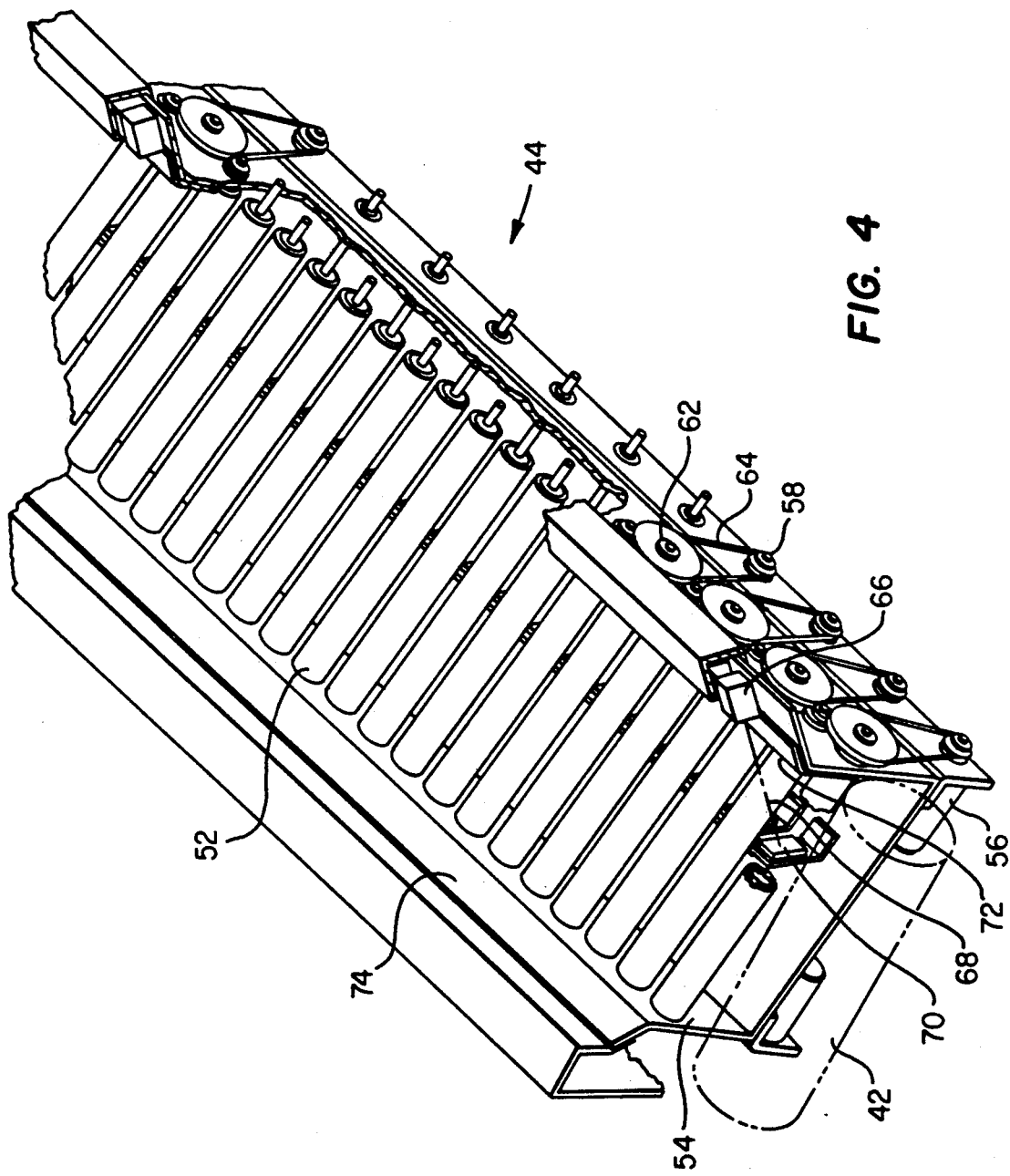
FIG. 4 is a partial perspective view of the apparatus of FIG. 1 showing the feeder rolls and feed roller.
Figure 7A:
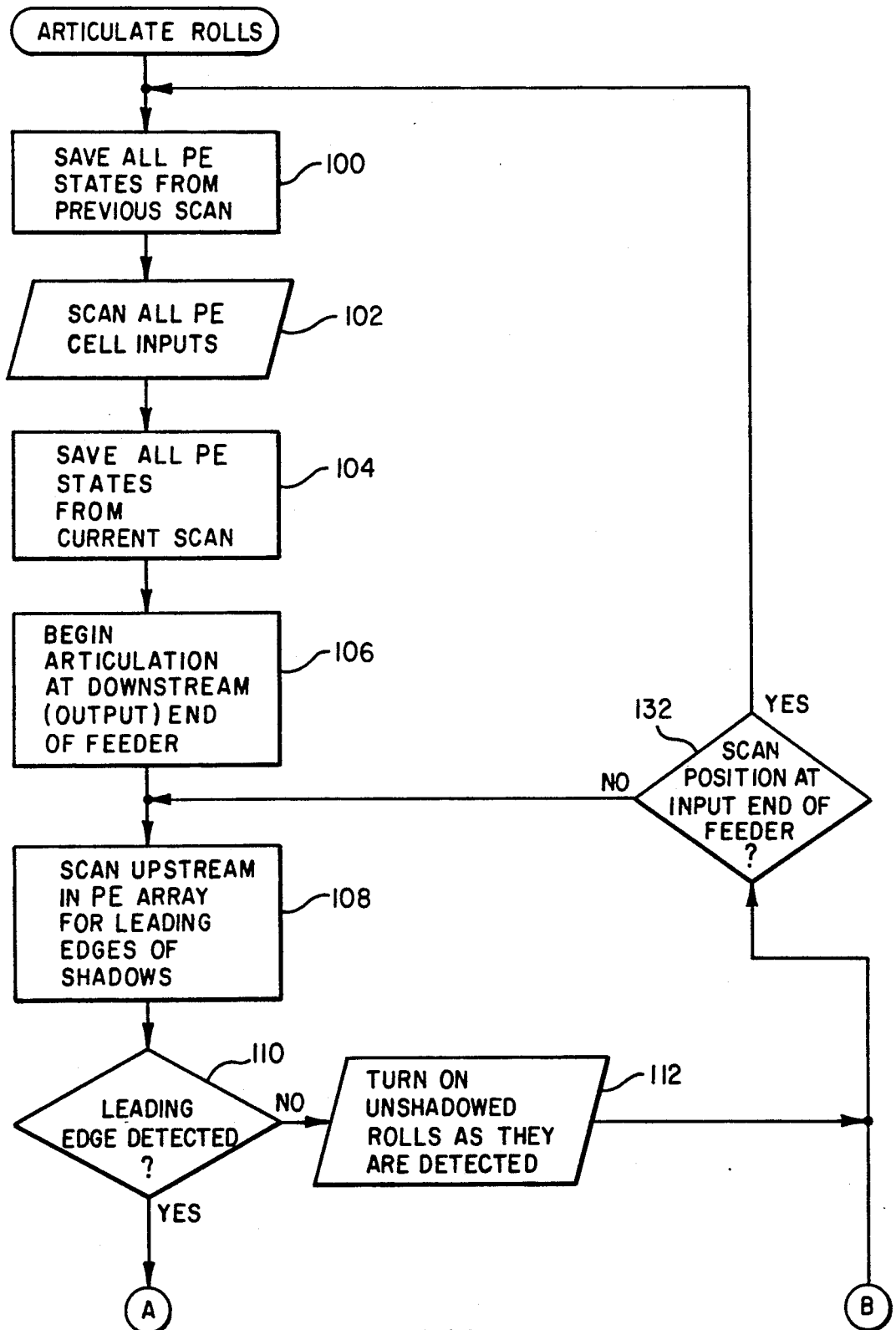
FIGS. 7A, 7B, 8, 9, 10A and 10B are a flow diagrams illustrating one embodiment for controlling the individual feeder rolls to effectuate separation of stacked products into a sequence of individual products.
Figure 7B:
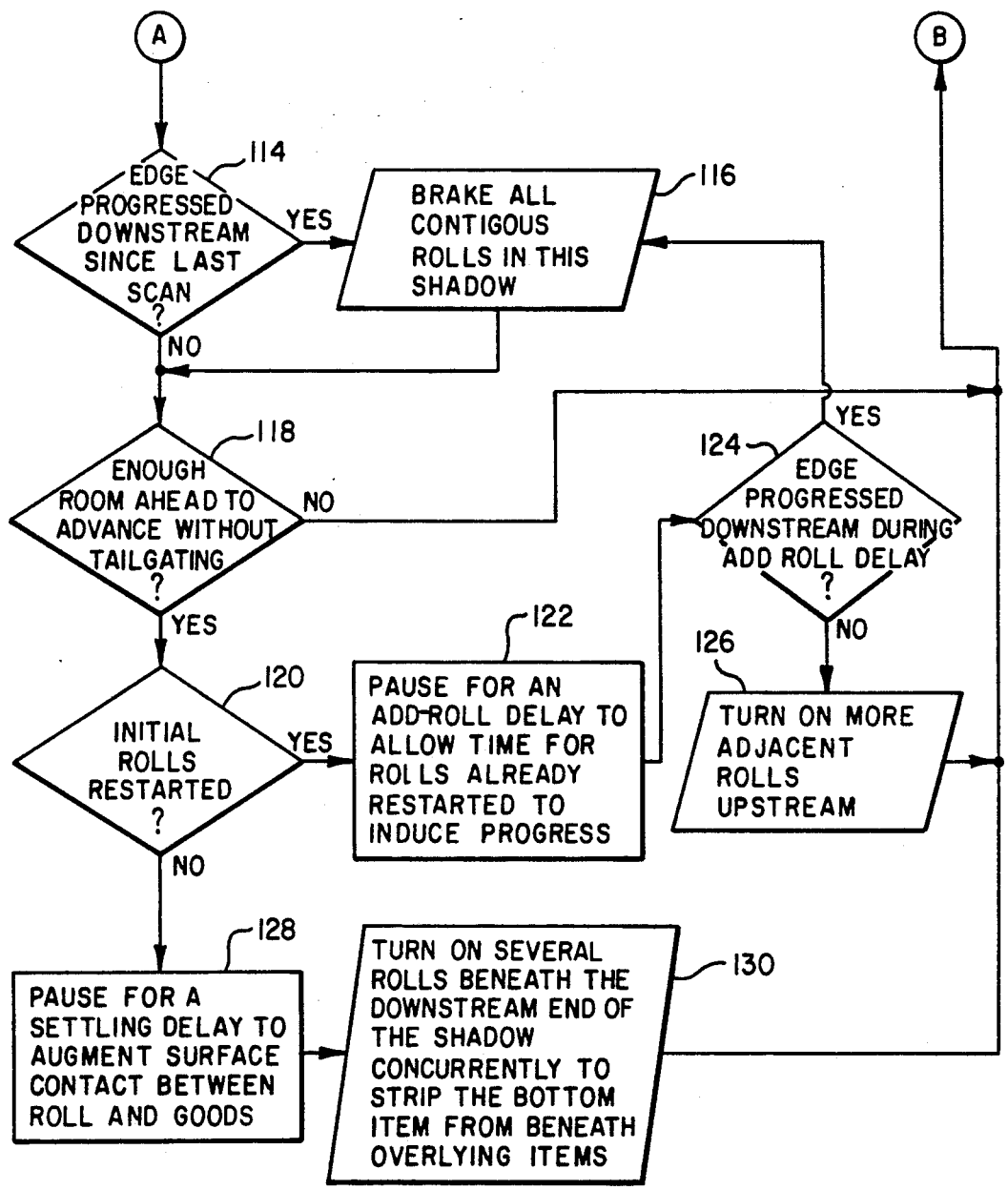
Figure 8:
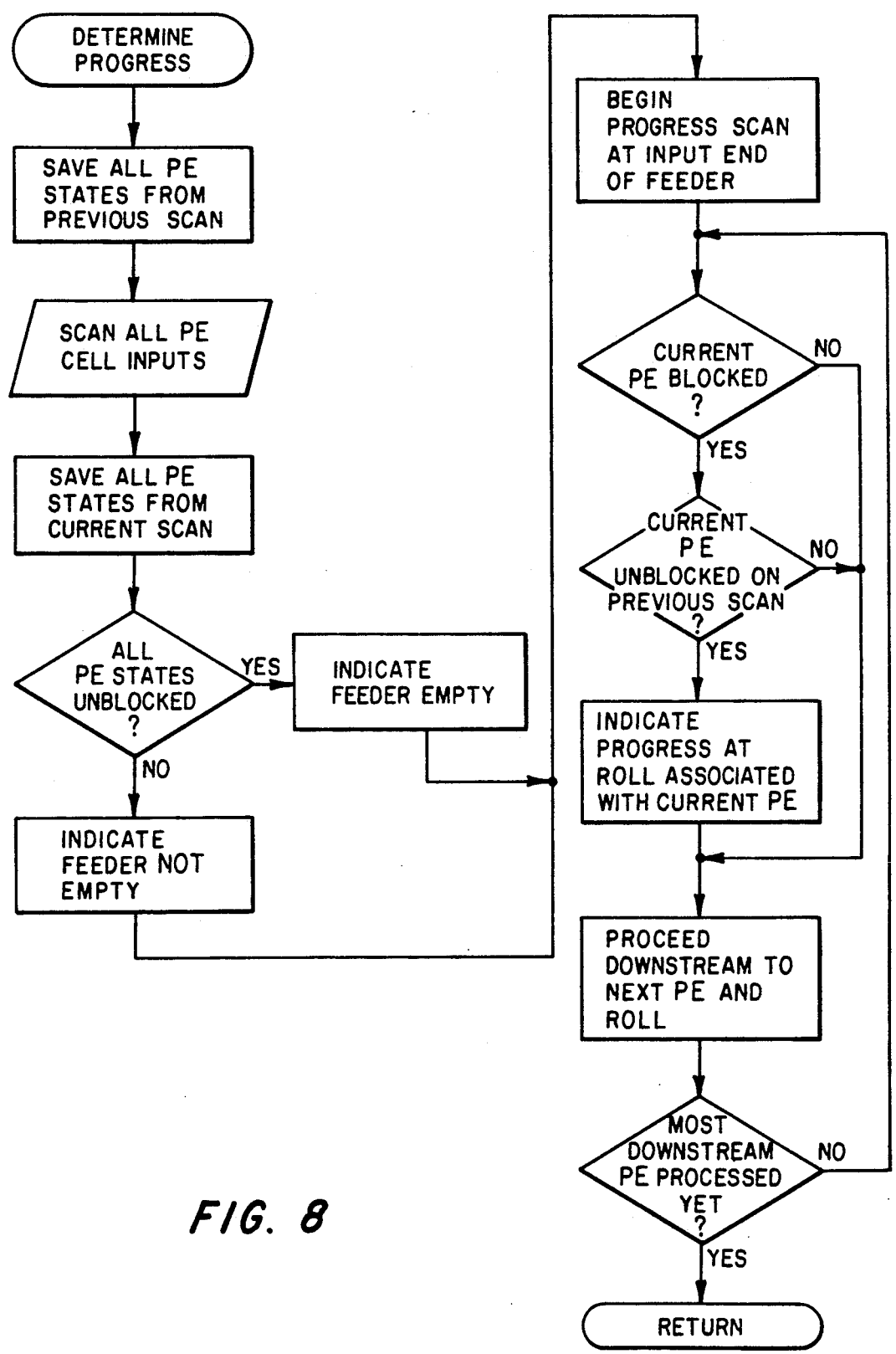
Figure 9:
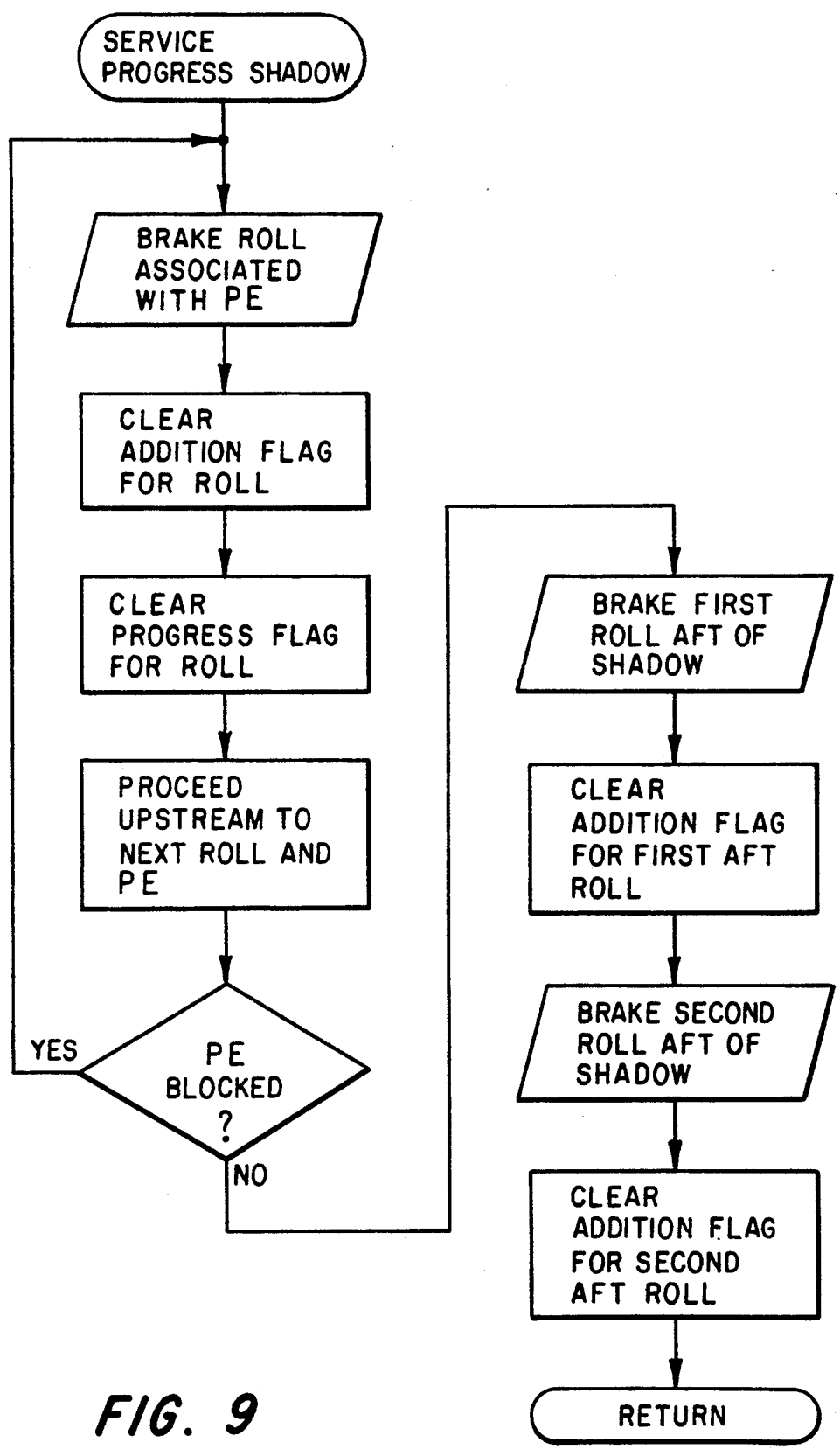
Figure 10A:
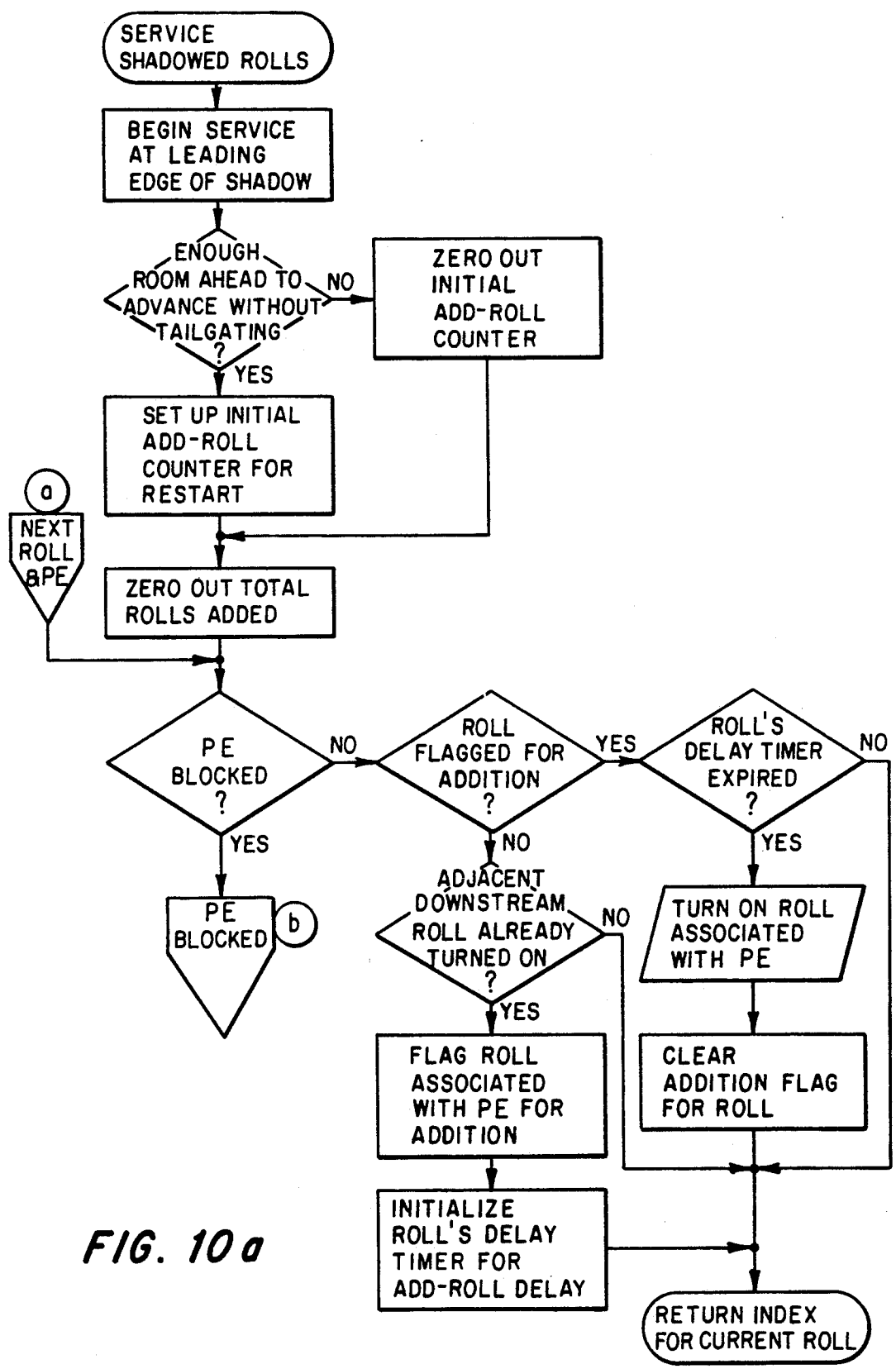
Figure 10B:
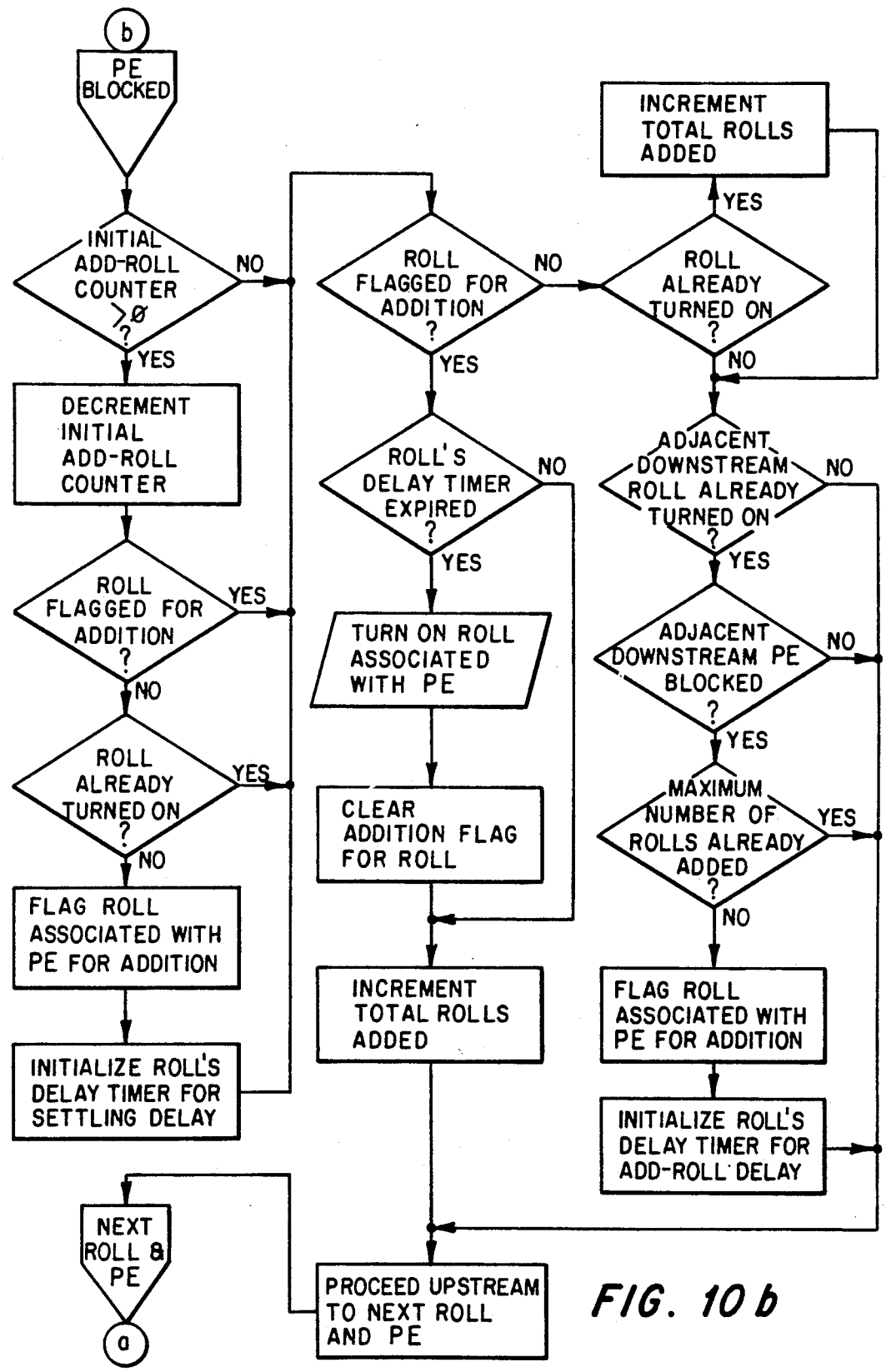

Referring now to the Drawings, and particularly to FIG. 1, there is shown an apparatus 30 for separating, feeding and sorting products. The apparatus 30 defines a transport path illustrated in part by the arrows 32 and 34 and comprising an infeed conveyor belt 40, a feed roller 42, an inclined and laterally tilted separator 44, an output conveyor belt 46, and a divert gate 48. The apparatus 30 further includes a bar code scanner 50 and a central processing unit 60. The main operating components of the apparatus 30 are enclosed within a housing 90.

In the operation of the apparatus 30, bulk stacks of products are loaded by human operators onto the infeed conveyor belt 40 and are directed thereby to the feed roller 42. Computer control of feed roller 42 and infeed conveyor 40 regulates entrance of products onto the separator 44. When the central processing unit 60, through sensing means to be described, fails to detect the presence of products at the upstream end of the separator 44, the central processing unit 60 energizes the infeed conveyor belt 40 and feed roller 42 to move more products onto the separator 44.

The separator 44 consists of a series of individually and selectively controlled feeder rolls 52 arranged on a laterally tilted inclined plane. The central processing unit 60, through sensing means to be described, detects the position and movement of products on the separator 44, and in response energizes the feeder rolls 52 to effect separation of stacks of products into a sequence of individual products.

After separation, the individual products continue to move downstream onto the output conveyor belt 46 where they are transported through a bar code scanner 50. The scanned bar codes are transmitted to the central processing unit 60 and the individual products are sorted by the divert gate 48 into designated receptacles (not shown) in response to control signals from the central processing unit 60. For each scanned product, the bar code is compared to a set of "reject" and "process" bar codes stored in the central processing unit 60. If the scanned bar code matches a stored "reject" bar code, the central processing unit 60 sends a signal to instruct the divert gate 48 to direct the product to a bin (not shown) where it is collected and either recycled or processed manually. If the bar code matches a stored "process" code, the central processing unit 60 generates a signal to instruct the divert gate 48 to direct the product to a bin (not shown) for further processing. If the scanner fails to find a bar code the central processing unit 60 sends a signal to instruct the divert gate 48 to direct the product to a residual bin (not shown) where it is collected and sent back through the apparatus 30 for reprocessing.

The central processing unit 60 preferably comprises a computer capable of directing all of the functions of the separating and sorting apparatus 30 in accordance with a software program that is a principal component therein. The aforementioned computer includes such features as an 80286 CpU, 640K RAM, 1.2 MB floppy disk, 20 MB hard disk, two serial ports and one parallel port. As computers of this type are well known and the detailed construction of the computer itself does not form part of the present invention, further description of the computer is deemed unnecessary.

Sort-and-tally software plans for each product are stored in ASCII data files located either on floppy disk or downloaded to the computer hard drive. Several thousand valid bar codes may be input for a given sort-and-tally software plan. At the end of each run, the computer generates a report for each product that tallies the occurrences of each detected bar code. The report also tallies extraneous bar codes and indicates the total number of products that were diverted because of unreadable bar codes. The computer also performs data acquisition functions, either by means of the aforementioned bar code scanner 50 or by means of sensors to be described. Furthermore, the computer exercises control over the individual elements of the apparatus 30 by energizing the motors powering the infeed conveyor belt 40, feed roller 42, feeder rolls 52, output conveyor belt 46 and divert gate 48.

Referring now to FIGS. 1 and 5, the sensor for regulating entrance of products onto the separator 44 comprises a convergent beam photoelectric cell 80 connected to the central processing unit 60. Convergent beam photoelectric cell 80 detects distance changes between the cell and the object sensed, in this case a product 82. In the preferred embodiment of the apparatus 30, the cell 80 is positioned between the feed roller 42 and the upstream edge of the first feeder roll 52 of the separator 44. Because the feed roller 42 has a much larger diameter than the feeder rolls 52, product 82 does not immediately rest flush with the first feeder roll 52 as shown by the solid line product 82 in FIG. 5. After the product has moved slightly downstream on the separator 44, the trailing edge of the product 82 falls on the first feeder roll 52 of the separator 44 as shown by the broken line product in FIG. 5. The cell 80 "shoots" an infrared sensing beam 84 that responds to the distance change between the solid and broken line product positions and transmits a signal indicative of this position change to the central processing unit 60. If the beam 84 from the cell 80 does not detect the broken line product position, then the central processing unit 60 knows that a product or group of products 82 is not present at the upstream edge of the separator 44. The central processing unit 60 then energizes the power motors for the infeed conveyor belt 40 and feed roller 42 allowing further products to enter the separator 44.

If the beam 84 of the cell 80 detects a broken line product position, the central processing unit 60 knows that there is sufficient product in position on the separator 44. The central processing unit 60 then de-energizes the power motors for the infeed conveyor belt 40 and feed roller 42 inhibiting further products from entering and crowding the separator 44. Operation of the input end of the separator 44 in this manner prevents overloading of the separator 44 permitting the separation process to occur more efficiently and effectively.

Referring now to FIGS. 1, 2, 3, 4 and 6, the separator 44 includes a plurality of individually and selectively controlled feeder rolls 52 arranged on a laterally tilted inclined plane. Each feeder roll 52 is mounted in a frame 54. The drive mechanism for each feeder roll 52 is mounted on the frame 54 and comprises a motor 56. The motor 56 preferably is a constant speed D.C. electric motor. Mounted to the motor 56 is a pulley 58 driving a belt 64 to direct operating power to a second pulley 62 rotatively mounted on the frame 54. The second pulley 62 is mounted to the shaft supporting the feeder roll 52. Thus, in the preferred embodiment, a single motor 56 is utilized to actuate a pulley 58 which in-turn operates, through belt 64 and pulley 62, one feeder roll 52.

The separator 44 has an inside and outside rail, 72 and 74 respectively, and has been laterally tilted with respect to the inside rail 72 and outside rail 74 so that the inside rail is at a lower horizontal elevation (approximately a 7° tilt) than the outside rail. Configuration of the separator 44 in this manner causes products to slide toward and ride next to the inside rail 72. Thus, at the discharge from the separator 44, the products are lined up in a single file against the inside rail 72. This facilitates a more accurate identification of the products by the bar code scanner 50 as described below.

The separator 44 has also been longitudinally positioned to form an inclined plane. Configuration of the separator 44 in this manner allows for utilization of gravitational forces to assist separation of stacked products. Because the coefficient of friction between two stacked products is lower than that between the underlying product and the feeder rolls 52 and because of the angle of incline (approximately 22°) of the separator 44, the overlying products tend to slide backward separating the stack.

In the operation of the separator 44, the feeder rolls 52 are selectively and individually energized by the central processing unit 60, according to a program to be described, in response to position and movement information detected by an array of photoelectric cells 66 located over the inside rail 72 of the separator 44. Each feeder roll 52 has a corresponding photoelectric cell 66 to detect the presence or absence at that roll of the product being processed by the separator 44. The photoelectric cells 66 are positioned to detect an infrared beam 68 through the gap between individual feeder rolls 52 on the separator 44. The infrared beam 68 directed between rollers 52 is reflected by a retroreflector 70 and detected by the photoelectric cell 66. Products riding on the feeder rolls 52 block the infrared beam 68 from the retroreflector 70 creating "shadow" areas on the separator 44. The central processing unit 60 scans the entire array of photoelectric cells 66 to find all shadows on the separator 44 and compares the information obtained to that stored from a previous scan. The central processing unit 60 thus determines the position and relative movement of all products on the separator 44 and decides whether a shadow indicates the presence of a stacked group or an individual product. From these determinations, the central processing unit selectively energizes individual feeder rolls or sets of feeder rolls to separate stacks of products into individual units.

Referring to FIGS. 7A, 7B, 8, 9, 10A and 10B, a subroutine for controlling the feeder rolls 52 is diagrammatically illustrated via a set of flowcharts. The subroutine is particularly directed to scanning the photoelectric cell array 66 and articulating individual feeder rolls or sets of feeder rolls to effectuate the separation of products and continued downstream movement.

Each feeder roll 52 on the separator 44 has a corresponding photoelectric cell 66 and information from a previous scan of the cells array is stored in operational step 100. The array of photoelectric cells 66 is scanned collectively during operation 102 to determine present product placement on the separator 44. Contiguous sequences of blocked photoelectric cells occur in areas where products are resting on feeder rolls. The results of the scan are stored by the central processing unit 60 during operation 104 for later comparison with the most recent previous scan stored in operational step 100.

In order to minimize friction ahead of an advancing product, all feeder rolls not currently in shadowed areas, i.e. not covered by a product or a group of products, are energized. The subroutine scans the photoelectric cell array starting at the downstream/output end during sequence 108 and searches for the leading edges of all products. When a leading edge is not detected by a photoelectric cell during inquiry 110, the subroutine energizes during sequence 112 that cell's corresponding feeder roll. Once a leading edge has been detected as determined during decision sequence 110, the subroutine compares the present scan array stored during operation 104 with the previous scan array stored during operational step 100 to determine in decision sequence 114 if the leading edge of the shadow has progressed downstream. This operation is shown in more detail in FIG. 8. When progress of the leading edge of a shadowed area is detected, all rollers in the shadowed area are switched into a braking mode during sequence 116. This operation is shown in more detail in FIG. 9.

The subroutine then begins the process of servicing each shadowed roll on the separator. This process is shown in detail in FIGS. 10A and 10B and described below with reference to FIGS. 7A and 7B. Before restarting any rollers in the shadowed areas, the subroutine tests in decision sequence 118 if there are enough unblocked photoelectric cells downstream from the leading edge of the shadowed area to permit downstream movement without tailgating. If there is not enough space for further downstream movement, the subroutine advances to inquiry sequence 132 for recycling through the subroutine. Inquiry sequence 132 tests to determine if the subroutine has serviced all shadows, i.e. has progressed to the upstream edge of the separator. If all shadows have not been serviced, the subroutine returns to sequence 108 to service the next upstream shadow.

When there is enough space for further downstream movement, the subroutine advances to inquiry sequence 120 to test if initial feeder rolls have been restarted. If the initial rolls have not been restarted as determined during inquiry sequence 120, then the subroutine advances to operational sequence 128 for a settling delay.

The settling delay resulting from operation of sequence 128 then occurs before any feeder rolls are restarted in the shadowed area. This delay allows the feeder rolls in the shadowed area to establish better contact with the underside of the underlying product. This maximizes the friction force available to move the product downstream and induces a "start/stop" motion to cause the overlying products to separate from the individual underlying product. After the settling delay has expired, and if no tailgating problems exist, the subroutine during sequence 130 energizes several feeder rolls beneath the leading edge of the shadowed area. This action attempts to induce rapid acceleration of the underlying product at the leading edge of the stack to pull the underlying product from the stack.

Once these initial feeder rolls have been started, the subroutine advances to the inquiry sequence 132 and because one control cycle has yet to be completed, the subroutine returns to the inquiry sequence 120 to continue service of each upstream shadow. Since the initial feeder rolls have been restarted, the subroutine advances from inquiry sequence 120 to add-roll delay sequence 122 to pause and wait for downstream progress to occur at the shadow currently being serviced. Inquiry sequence 124 tests to determine if the shadow edge has progressed downstream during the add-roll delay sequence 122 and if progress has occurred, the subroutine advances to braking sequence 116. If progress has not occurred, then, the subroutine adds a new feeder roll upstream from and adjacent to the presently energized feeder rolls in the shadowed area during sequence 126. Next the subroutine advances back to inquiry sequence 132 and services the next upstream shadow. Additional feeder rolls under shadowed areas are added on a one by one basis across several successive control cycles until either new progress occurs or all rollers in the shadowed area are turning. Once the subroutine has completed one control cycle by servicing all shadows on the separator, the subroutine returns to operational step 100 through inquiry sequence 132 to restart the process. This process of selectively energizing feeder rolls continues for each shadowed area until no shadowed areas are detected. When the separator is empty, all feeder rolls are turned off.

Although a preferred embodiment of the invention has been illustrated in the accompanying Drawings and described in the foregoing Detailed Description, it will be understood that the invention is not limited to the embodiment disclosed but is capable of rearrangements and modifications of parts and elements without departing from the scope of the invention.

I claim:

1. A method for separating stacked products along a transport path having a plurality of individually controlled feeder rolls comprising the steps of:

determining the location of products along the transport path;

comparing the present location of products along the transport path with the past location to detect movement;

stopping feeder rolls located under products that have moved;

pausing to augment surface friction contact between the bottom product in the stack and the transport path feeder rolls; and energizing several feeder rolls beneath the leading edge of the product stack to strip the bottom product out from under the stack.

2. A method for separating products along a feeder roll transport path having a plurality of selectively controlled feeder rolls, comprising the steps of:

(a) feeding products onto the feeder roll transport path;

(b) sensing the location of products on the transport path;

(c) identifying whether the products on the feeder roll transport path are stacked or separate;

(d) activating at least one feeder roll located at the downstream edge of each sensed product or stack of products on the feeder roll transport path;

(e) sensing movement of the product or stack of products;

(f) activating additional feeder rolls under a product or stack of products on a one-by-one basis if no movement is detected;

(g) deactivating selected feeder rolls when movement is detected;

(h) sensing a new location of all products on the feeder roll transport path;

(i) repeating steps (a) through (h) to separate stacks of products into a stream of single products by stripping a bottom product from each identified product stack and move products downstream by maintaining proper spacing between successive identified separated products.

3. Apparatus for separating products into a stream of individual products, comprising:

conveyor means, comprising:

an infeed conveyor belt for receiving stacked products;

a feed roller receiving the stacked products from the infeed conveyor for controlling further downstream movement of the products;

a plurality of selectively controlled feeder rolls arranged on an inclined plane receiving stacked products from said feed roller for separating products into a product stream; and an output conveyor belt receiving separated products from the feeder rolls for continuous downstream movement for further processing;

means for sensing the movement and location of products along said conveyor means and generating signals indicative thereof; and a control unit connected to said conveyor means and said means for sensing to receive and process signals generated by said means for sensing, and in turn generating control signals to regulate entry of products from the feed roller to the feeder rolls and to selectively actuate feeder rolls to separate the products into a stream of single products at the output conveyor belt.

4. The apparatus for separating as set forth in claim 3 wherein the conveyor means further comprises:

means for identifying the location of product stacks and single products on the feeder rolls; and means for stopping and starting sets of feeder rolls under a stack of products according to control signals from the control means to strip the bottom product from an identified stack of products.

5. The apparatus for separating as set forth in claim 3, further comprising:

means for controlling movement of said infeed conveyor belt and said feed roller to deliver products to the plurality of feeder rolls.

6. The apparatus for separating as set forth in claim 5 wherein the means for controlling includes:

a convergent beam photoelectric cell located on the downstream side of the feed roller to detect the presence of products resting on a first upstream one of the individually and selectively controlled feeder rolls; and means for controlling actuation of the infeed conveyor belt and feed roller to cause products to enter onto the selectively controlled feeder rolls when no products are detected resting on the first upstream feeder roll.

* * * * *